Aug. 17, 1926.
J. HURCK
1,596,268
MOTOR CYCLE SUSPENSION
Filed August 18, 1922   2 Sheets-Sheet 1
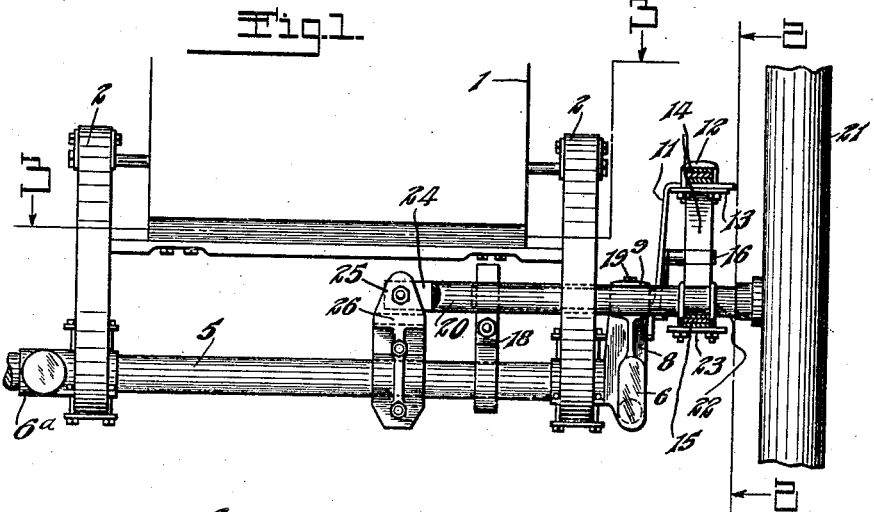
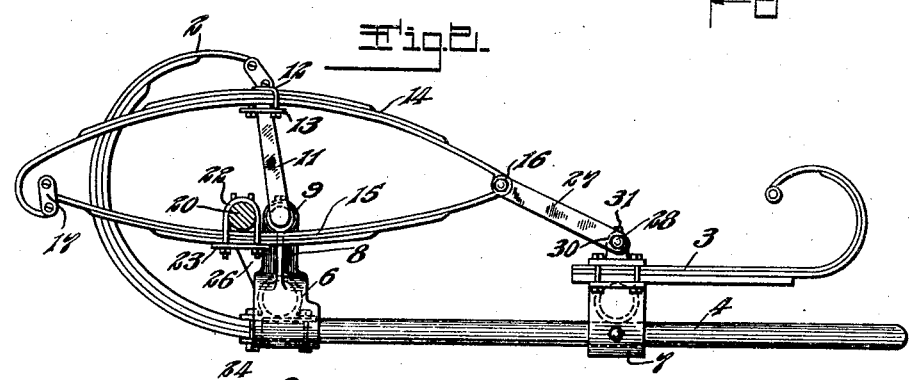
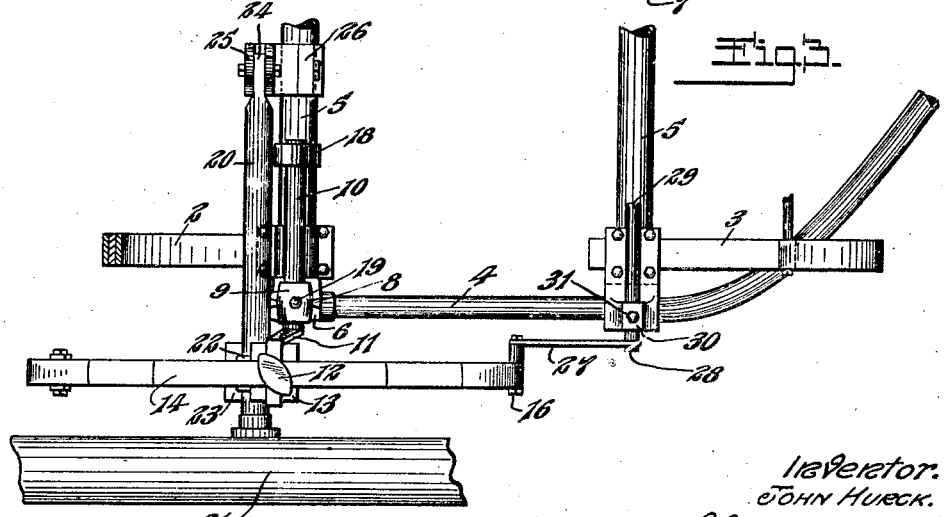
Inventor.
JOHN HURCK.
Attorney.

Aug. 17, 1926.
J. HURCK
1,596,268
MOTOR CYCLE SUSPENSION
Filed August 18, 1922   2 Sheets-Sheet 2
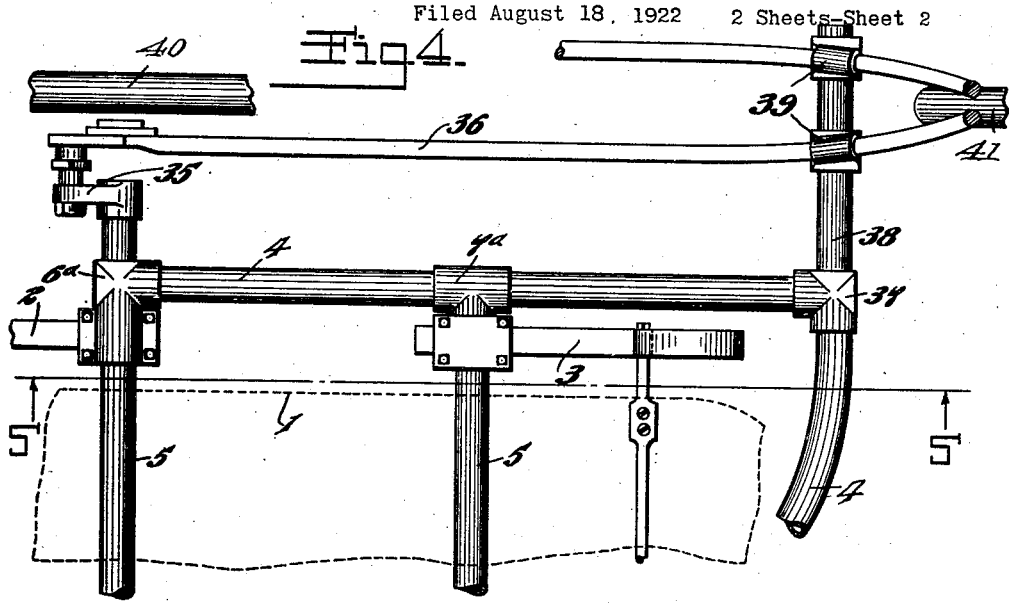
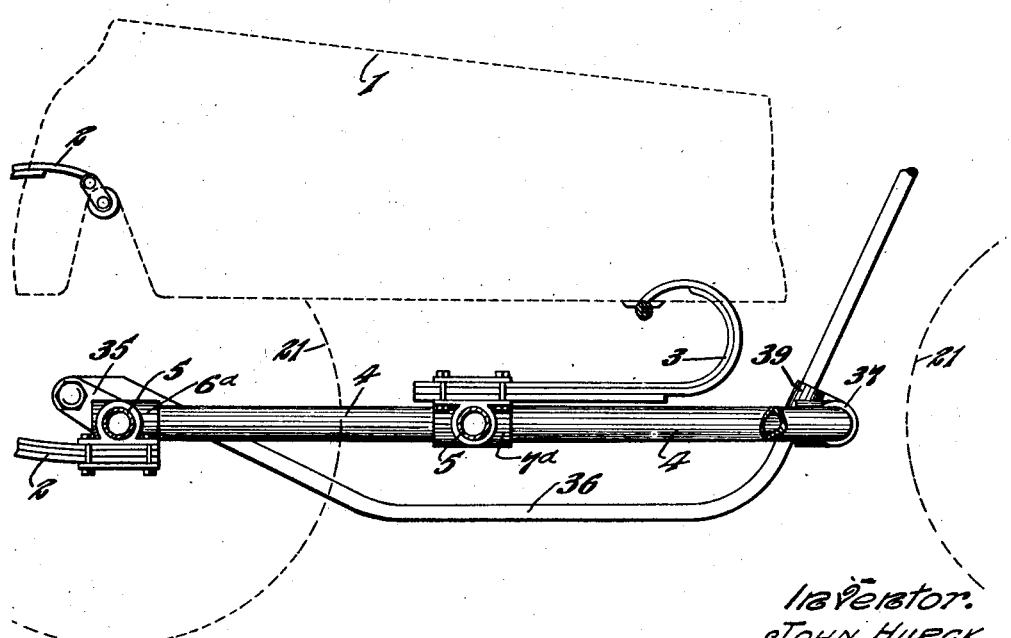
Inventor.
JOHN HURCK.
Attorney.

Patented Aug. 17, 1926.

1,596,268

UNITED STATES PATENT OFFICE.

JOHN HURCK, OF ST. LOUIS, MISSOURI.

MOTOR-CYCLE SUSPENSION.

Application filed August 18, 1922. Serial No. 582,676.

This invention relates to motor-cycles, and more particularly to spring suspensions for the side car often used with a motor-cycle.

In the ordinary construction of a motor-cycle side car, the body of the car is suspended on springs mounted on a frame or chassis which is connected to the motor-cycle frame and provided with an axle upon which the side wheel is mounted. In the ordinary construction, the side wheel axle is rigidly mounted on the chassis and all of the shocks incident to travel over roads are transmitted from the side wheel directly to the chassis. Cushioning of such shocks to the body of the car is accomplished entirely by the springs by which the car is mounted on the chassis.

One of the objects of this invention, therefore, is to provide a structure by means of which the shocks due to travel over the road are additionally cushioned with respect to the car body.

Another object of this invention is to provide a construction whereby the shocks may be transmitted to the chassis through a spring suspension.

Further objects will appear from the detail description taken in connection with the accompanying drawing, in which:—

Figure 1 represents a rear view of a portion of the side car mounting of a motor-cycle embodying this invention;

Figure 2 is a side view of the spring suspension taken on line 2—2, Figure 1;

Figure 3 is a plan view taken on line 3—3, Figure 1;

Figure 4 is a fragmentary plan view of the chassis, showing the connection thereof to the motor cycle frame; and Figure 5 is a section on line 5—5, of Figure 4.

Referring to the accompanying drawing, 1 represents the side car body which is suspended on springs 2 and 3 mounted on the frame or chassis comprising a pair of tubular side members 4, connected by a pair of tubular cross members 5. These connections may be made by means of fittings 6 and 6ª, 7 and 7ª to which the tubular members may be attached by brazing or other suitable means. The rear cross-member 5 extends through the fitting 6ª and is connected at 35 by any usual means to the frame 36 of the motor-cycle. The motor-cycle frame 36 may be of any suitable construction and has associated therewith the usual road wheels including a traction wheel 40 and a steering wheel 41. The outer member 4 bends inwardly at the front of the chassis so as to meet the inner member 4 to which it is connected by the fitting 37, and is provided beyond that fitting with an extension 38 which is connected at 39 to the forward part of the motor-cycle frame 36. Further bracing to the motor-cycle frame may be provided but the same is not illustrated in the drawings as it forms no part of the present invention.

The fitting 6 may be provided with an upstanding portion 8 provided with a socket 9 adapted to receive the shank 10 of a supporting bracket 11. The bracket 11 has a bent-over, flattened upper end which has mounted thereon by means of a suitable stirrup 12 and clamping plate 13, an elliptic spring comprising an upper half 14 and a lower half 15. These halves are joined together at their ends by the usual connections 16 and 17. The bracket 11 may be additionally supported by a clamp 18 embracing the shank 10 and the cross member 5 so as to render the bracket rigid. A set screw 19 is adapted to clamp the shank 10 in the socket 9.

An axle 20 upon which the side wheel 21 may be mounted in any usual manner is connected by means of a pair of U-bolts 22 and a clamping plate 23, or by any other suitable fastening, to the lower half 15 of the elliptic spring. The other end of the axle 20 is provided with a flattened portion 24 which is pivoted to the cleft end 25 of a bracket 26 clamped to the rear cross member 5. This bracket provides a pivot for the shaft 20 so that the end thereof which carries the wheel 21 may be free to move up and down, except as restrained by the spring 14—15. The bracket 26 also provides an anchor for the shaft 20 to restrain any axial movement of the same while allowing free vertical movement as stated. In order to prevent excessive longitudinal movement of the shaft 20 in a forward and rearward direction, a link 27 may be pivoted at 16 in any usual manner to the elliptic spring and pivotally anchored at 28 on the fitting 7. The connection of the link 27 to the fitting 7 may be made by means of a nut 28 on a rod 29 fitting in a socket 30 on the fitting 7. A set screw 31 is adapted to clamp the rod 29 in the socket 30. The nut 28 may be screwed down upon a shoulder on the rod 29 in a well known manner so as to provide a free pivotal movement of the link 27 on the rod 29 as the spring 14—15 gives under the influence of variations in the road surface.

It will be noted that, on account of the detachable connections at the bracket 26, the clamp 18 and the sockets 9 and 30, the position of the side wheel 21 with respect to the chassis may be adjusted laterally by sliding the rods 29 and 10 in or out of the sockets 30 and 9 respectively and moving the bracket 26 correspondingly along the cross member 5. In this way, the gage of the road wheels may be adjusted to suit the requirements of the user. This is desirable so that the device may be applied to motor-cycles of various makes and in each case, the gage of the wheels may be adjusted to correspond with the standard gage of automobile wheels. With such adjustment made, the driver may accommodate himself to ruts in a road in the same way that the driver of an automobile may so accommodate himself. During such adjustment, the spring 14—15 and the link 27 move with the wheel 21 so that their relative positions need not be changed.

It will be evident that the invention accomplishes its objects. A spring suspension for the side car of a motor-cycle is provided which is adapted to cushion the shock of travel to the chassis upon which the body itself is spring suspended so that the shocks thereto are thus doubly cushioned and the riding qualities of the car greatly improved. This is accomplished by pivotally mounting the wheel axle on the chassis underneath the body and providing a spring suspension at the end of the axle adjacent the wheel hub. It will be seen that by this provision most of the road shocks are delivered directly to the spring 14—15 so that shocks to the chassis and the body will be greatly relieved thereby. This device may easily be applied to any existing make of side car and is readily adjustable to any desired wheel gage.

It is obvious that various changes may be made in details of construction without departing from the spirit of this invention; it is, therefore, to be understood that this invention is not to be limited to the specific details shown and described.

Having thus described the invention, what is claimed is:—

1. A motor-cycle having a frame, a road wheel thereon, a side car, a supporting chassis for said car and connected with said frame, an axle pivoted at its inner end to said side car chassis to move vertically with respect thereto, a side wheel on the outer end of said axle, and a supporting leaf spring for said chassis connected at its center to said axle and connected at its ends to said chassis above said axle.

2. A motor-cycle having a frame, a road wheel thereon, a side car, a supporting chassis for said car and connected with said frame, a side wheel, an axle pivoted at its inner end to said side car chassis to move vertically with respect thereto, a side wheel on the outer end of said axle, a leaf spring connected at its center to said axle, and a bracket on said chassis rising above said axle and connected to said spring above said axle.

3. A motor-cycle having a frame, a road wheel thereon, a side car, a supporting chassis for said car and connected with said frame, a side wheel, an axle for said side wheel and connected for movement relatively to said chassis, and a double elliptic spring having one bow connected to said axle and having the other bow thereof connected to said chassis above said axle.

4. A motor-cycle having a frame, a road wheel thereon, a side car, a supporting chassis for said car and connected with said frame, a side wheel, an axle for said wheel adapted for movement relatively to said chassis, a supporting spring for said chassis connected to said axle, and an anchor flexibly connecting said spring with said chassis and adapted to restrain said spring longitudinally with respect to said chassis.

5. A motor-cycle having a frame, a road wheel thereon, a side car, a supporting chassis for said car and connected with said frame, an axle pivoted at its inner end to said side car chassis to move vertically with respect thereto, a side wheel on the outer end of said axle, a supporting leaf spring for said chassis connected at its center to said axle and connected to said chassis, and an anchor flexibly connecting said spring with said chassis.

6. A motor-cycle having a frame, a road wheel thereon, a side car, a supporting chassis for said car and connected with said frame, a side wheel, an axle for said side wheel and connected for movement relatively to said chassis, a double elliptic spring having one bow connected to said axle and having the other bow thereof connected to said chassis above said axle, and an anchor flexibly connecting said spring with said chassis.

7. A motor-cycle having a frame, a road wheel thereon, a side car, a supporting chassis for said car and connected with said frame, means for yieldingly sustaining said car on said chassis, an axle pivoted at its inner end to said side car chassis to move vertically with respect thereto, a side wheel on the outer end of said axle, and a supporting leaf spring for said chassis connected at its center to said axle and connected to said chassis.

8. A motor-cycle having a frame, a road wheel thereon, a side car, a supporting chassis for said car and connected with said frame, an axle pivoted at its inner end to said side car chassis to move vertically with respect thereto, a side wheel on the outer end of said axle, and a double elliptic spring having one bow connected to said axle and having the other bow thereof connected to said chassis above said axle.

9. A motor-cycle having a frame, a road wheel thereon, a side car, a supporting chassis for said car and connected with said frame, a side wheel, an axle for said side wheel connected for movement relatively to said chassis, a supporting spring for said chassis and connected to said axle, and means for adjusting said axle with respect to said chassis.

10. A motor-cycle having a frame, a road wheel thereon, a side car, a supporting chassis for said car and connected with said frame, a side wheel, an axle for said side wheel and having a pivot bearing on said chassis beneath the car, a supporting spring for said chassis connected to said axle, and means for adjusting said pivot bearing with respect to said chassis.

11. A motor-cycle having a frame, a road wheel thereon, a side car, a supporting chassis for said car and connected with said frame, a side wheel, an axle for said wheel having a pivot bearing on said chassis beneath the car, a supporting spring for said chassis connected to said axle, and means for mounting said spring and said pivot bearing for adjustment with respect to said chassis.

12. A motor-cycle having a frame, a road wheel thereon, a side car, a supporting chassis for said car and connected with said frame, a side wheel, an axle for said side wheel connected for movement relatively to said chassis, a supporting spring for said chassis and connected to said axle, and means for adjusting said axle and said spring with respect to said chassis.

13. In a motor-cycle having a side car, a supporting chassis therefor and a side wheel, a supporting spring for said chassis connected to said axle, an anchor for sustaining said wheel with respect to said chassis, means for adjusting said wheel, and means for correspondingly adjusting said anchor.

14. A motor-cycle having a frame, a road wheel thereon, a side car, a supporting chassis for said car and connected with said frame, an axle pivoted at its inner end to said side car chassis to move vertically with respect thereto, a side wheel on the outer end of said axle, a supporting leaf spring for said chassis connected at its center to said axle and connected to said chassis, and means for adjusting said axle with respect to said chassis.

15. A motor-cycle having a frame, a road wheel thereon, a side car, a supporting chassis for said car and connected with said frame, an axle pivoted at its inner end to said side car chassis to move vertically with respect thereto, a side wheel on the outer end of said axle, a supporting leaf spring for said chassis connected at its center to said axle and connected to said chassis, and means for adjusting said axle and said spring with respect to said chassis.

In testimony whereof I affix my signature this 22nd day of July, 1922.

JOHN HURCK.